(12) United States Patent
Pourreau et al.

(10) Patent No.: US 6,906,136 B2
(45) Date of Patent: *Jun. 14, 2005

(54) UV-CURABLE COMPOSITIONS

(75) Inventors: Daniel B. Pourreau, Exton, PA (US);
Shanti P. Patel, Brookhaven, PA (US);
L. Joseph Junker, Pottstown, PA (US);
Wei Wang, Boothwyn, PA (US);
Stephen H. Harris, Kennett Square, PA (US); Shao-Hua Guo, Exton, PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 96 days.

This patent is subject to a terminal disclaimer.

(21) Appl. No.: 10/420,680

(22) Filed: Apr. 22, 2003

(65) Prior Publication Data

US 2004/0214980 A1 Oct. 28, 2004

(51) Int. Cl.[7] .............................................. C08G 18/67
(52) U.S. Cl. ...................... 525/126; 525/100; 525/157; 522/95; 528/75
(58) Field of Search ............................. 522/95; 525/100, 525/126, 157; 528/75

(56) References Cited

U.S. PATENT DOCUMENTS

| 3,268,561 A | 8/1966 | Peppel et al. ............... 260/348 |
| 4,368,297 A | 1/1983 | Kato et al. ................... 525/342 |
| 4,518,726 A | 5/1985 | Kato et al. ..................... 524/32 |
| 4,618,703 A | 10/1986 | Thanawalla et al. ........ 560/209 |
| 5,244,696 A | 9/1993 | Hazan et al. ................ 427/402 |
| 5,382,642 A | 1/1995 | Guo ........................... 526/333 |
| 5,444,141 A | 8/1995 | Guo ........................... 526/347 |
| 5,475,073 A | 12/1995 | Guo ........................... 526/333 |
| 5,646,213 A * | 7/1997 | Guo ........................... 524/562 |
| 6,696,593 B2 * | 2/2004 | Wang et al. ................. 560/157 |

OTHER PUBLICATIONS

Dr. Wolfgang Fischer et al., "Dual Cure," *Redtech Report* Nov./Dec. 2001.
L. W. Arndt et al., "One and Two–Component UV–Curable Acrylic Urethane Coatings for Weatherable Applications", 80th Annual Meeting of the Federation of Societies for Coatings Technology Sci, online! Oct. 30, 2002 XP002287467.

* cited by examiner

*Primary Examiner*—Rachel Gorr
(74) *Attorney, Agent, or Firm*—Shao-Hua Guo

(57) ABSTRACT

A UV-curable composition is disclosed. The composition comprises a crosslinking agent, a hydroxyalkyl acrylate or methacrylate, and an acrylic polyol. The crosslinking agent is selected from the group consisting of multifunctional isocyanates, melamines, and silanes. The acrylic polyol comprises recurring units of an allylic alcohol. The composition can be irradiated to be solidified and then fully cured by the urethane, melamine, or silane reactions. Alternatively, the composition can be cured by the urethane, melamine, or silane reactions, and then fully cured by radiation. The invention provides low VOC but high performance coatings. More importantly, the invention provides a UV-curable system without the need for acrylated oligomers.

18 Claims, No Drawings

UV-CURABLE COMPOSITIONS

FIELD OF THE INVENTION

The invention relates to the UV-curable compositions. More particularly, the invention relates to UV-curable compositions made from acrylic polyols comprising recurring units of allylic alcohols.

BACKGROUND OF THE INVENTION

Acrylic coatings have superior appearance, weatherability, and chemical resistance. They are widely used in automotive clearcoats, industrial maintenance topcoats, general metal, wood furniture and flooring coatings. There are two general types of acrylic coatings: acrylic-urethane and acrylic-melamine. Acrylic-urethane coatings are based on acrylic polyols and isocyanates. Acrylic-melamine coatings are based on acrylic polyols and melamines. Acrylic-urethane coatings are usually packaged as two separate parts (2K). One part contains an acrylic polyol and the other an isocyanate. These two parts are mixed prior to application.

UV-curable coatings are usually one-part (1K) systems which contain a mixture of acrylic monomers and acrylated oligomers. Acrylated oligomers are commonly prepared by reacting a polyether polyol or polyester polyol with a diisocyanate to form an NCO prepolymer, and the later then reacts with a hydroxyalkyl acrylate. The existence of polyether or polyester often reduces the weatherability of the UV-curable coatings.

Despite their superior resistance to weathering, acrylic polyols are rarely used for making NCO prepolymers. Unlike polyether or polyester polyols, acrylic polyols are made by radical chain polymerization of hydroxyalkyl acrylates or methacrylates and alkyl acrylates or methacrylates. The hydroxyl groups are randomly pendant along the polymer chain, rather than located only at the chain ends. Also, acrylic polyols usually have more than two OH groups per chain. Thus, the reaction of acrylic polyols with diisocyanates often results in gel even under well-controlled conditions. Hence, acrylic polyol-based acrylated oligomers are not often found in UV-curable coatings.

Dual-cure coatings are known. See *Radtech Report, November–December* 2001 *issue*. These coatings are based on acrylated polyisocyanates and unsaturated polyester polyols. They can be first UV-cured to obtain tack-free surface so that the coated parts can be handled, buffed, or sanded. The coatings are then fully cured through urethane reaction. However, the known dual-cure coatings are still based on acrylated polyester oligomers, and thus they are difficult to make and are expensive.

New dual-cure coatings are needed. Ideally, the dual-cure coatings would not need acrylated polyester or polyether oligomers. Ideally, the dual-cure coatings would not need any acrylated oligomers.

SUMMARY OF THE INVENTION

The invention is a UV-curable composition. The composition comprises a crosslinking agent, a hydroxyalkyl acrylate or methacrylate, and an acrylic polyol. The crosslinking agent is selected from the group consisting of multifunctional isocyanates, melamines, and silanes. The acrylic polyol comprises recurring units of an allylic alcohol. The invention provides dual-cure coatings. The dual-cure coatings include UV-urethane, UV-melamine, and UV-silane systems. The composition can be irradiated to be solidified and then fully cured by the urethane, melamine, or silane reactions. Alternatively, the composition can be cured by the urethane, melamine, or silane reactions, and then fully cured by radiation. The invention provides low VOC but high performance coatings. More importantly, the invention provides a UV-curable system without the need for acrylated oligomers.

DETAILED DESCRIPTION OF THE INVENTION

The UV-curable composition of the invention comprises a crosslinking agent, a hydroxyalkyl acrylate or hydroxyalkyl methacrylate, and an acrylic polyol.

Suitable crosslinking agents include multifunctional isocyanates. Suitable isocyanates include diisocyanates and polyisocyanates. Aliphatic polyisocyanates are preferred for improved weatherability. Preferred polyisocyanates include, for example, 1,6-hexamethylene diisocyanate (HDI), polymeric HDI, isophorone diisocyanate (IPDI), polymeric IPDI, dicyclohexylmethane diisocyanate ($H_{12}$MDI), and polymeric $H_{12}$MDI, and IPDI- or HDI-based isocyanate-terminated prepolymers such as, for example, AIRTHANE ASN-540M prepolymer (product of Air Products).

Suitable crosslinking agents include melamines. Suitable melamines include commercial grade hexamethoxymethylmelamines, such as, for example, CYMEL 303, CYMEL 370 and CYMEL 325 crosslinkers (products of Cytec), and Resimene CE-7103 (product of UCB Chemical).

Suitable crosslinking agents include silanes. Suitable silane crosslinking agents are known in the art, and are taught, for example, in U.S. Pat. Nos. 4,368,297, 4,518,726, and 5,244,696, the teachings of which are incorporated herein by reference. Suitable silane crosslinking agents include, for example, copolymers of unsaturated monomers (e.g., acrylates) and alkoxysilanes having olefin or acrylate functionality (e.g., vinylalkoxysilanes or acrylatoalkoxysilanes).

Suitable hydroxyalkyl acrylate or methacrylate include hydroxyethyl acrylate, hydroxyethyl methacrylate, hydroxypropyl acrylate, hydroxypropyl methacrylate, hydroxybutyl acrylate, hydroxybutyl methacrylate, caprolactone acrylate, caprolactone methacrylate, the like, and mixtures thereof.

The acrylic polyol comprises recurring units of an allylic alcohol. Allylic alcohol preferably has the general structure:

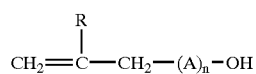

R is hydrogen, a $C_1$–$C_{10}$ alkyl, or a $C_6$–$C_{12}$ aryl group; A is an oxypropylene group; and n is an average number of oxyalkylene groups. Preferably, n is from about 0 to about 5. More preferably, n is from about 1 to about 2. Most preferably, n is about 1. Propoxylated allylic alcohol can be prepared by the reaction of allylic alcohol, such as allyl alcohol and methallyl alcohol, with propylene oxide in the presence of a base catalyst. See U.S. Pat. Nos. 3,268,561 and 4,618,703.

The acrylic polyol comprises recurring units of other monomers. Suitable monomers include alkyl acrylates and methacrylates, acrylic and methacrylic acids, vinyl aromatics, vinyl halides, vinyl ethers, vinyl esters, unsaturated nitriles, allyl esters, allyl ethers, allyl carbonates, conjugated dienes, and the like, and mixtures thereof.

Preferably, the acrylic polyol is a blend of a liquid acrylic polyol and a resinous polyol. Suitable liquid acrylic polyol preferably has a number average molecular weight (Mn) within the range of about 500 to about 10,000, a hydroxyl number about 20 mg KOH/g to about 500 mg KOH/g, and a glass transition temperature ($T_g$) about −70° C. to 0° C. The liquid acrylic polyol preferably comprises recurring units of alkoxylated allylic alcohols. Examples of alkoxylated allylic alcohols are propoxylated allyl alcohol and ethoxylated allyl alcohol. Propoxylated allyl alcohol is more preferred. Allyl alcohol monopropoxylate is most preferred.

Suitable liquid acrylic polyol preferably comprises also recurring units of one or more $C_1$ to $C_{20}$ alkyl acrylates or methacrylates whose homopolymers have a $T_g$ below 25° C. It is important to select an acrylate or methacrylate that has low homopolymer $T_g$ because otherwise the liquid polyol would have a high $T_g$ and would not stay liquid at room temperature. Examples of suitable commercial alkyl acrylates and methacrylates include n-butyl acrylate, n-butyl methacrylate, lauryl acrylate, lauryl methacrylate, tridecyl acrylate, tridecyl methacrylate, 2-ethylhexyl acrylate, 2-ethylhexyl methacrylate, and the like, and mixtures thereof. The proportion of recurring units of $C_1$ to $C_{20}$ alkyl acrylates or methacrylates in the liquid acrylic polyol depends on many factors, but most important among these are the desired hydroxyl number and $T_g$ of the resin. Generally, it is preferred to incorporate an amount of $C_1$ to $C_{20}$ alkyl acrylates or methacrylates into the liquid polyol in an amount within the range of about 40% to about 98% by weight.

The liquid acrylic polyol is preferably prepared by a suitable free-radical polymerization process. U.S. Pat. No. 5,475,073, the teachings of which are incorporated herein by reference, describes a preferred process for making hydroxy-functional acrylic resins by using allylic alcohols or alkoxylated allylic alcohols. Generally, the allylic monomer is added into the reactor before the polymerization starts. Usually the acrylate or methacrylate is gradually fed during the polymerization. It is preferred to add at least about 50% by weight, preferably at least about 70% by weight, of the acrylate or methacrylate to the reaction mixture gradually. Preferably, the acrylate or methacrylate is added at such a rate as to maintain its steady, low concentration in the reaction mixture. Preferably, the ratio of allylic monomer to acrylate or methacrylate is kept essentially constant; this helps to produce a resin having a relatively uniform composition. Gradual addition of the acrylate or methacrylate enables the preparation of a liquid acrylic polyol having sufficiently low molecular weight and sufficiently high allylic alcohol or alkoxylated allylic alcohol content. Generally, it is preferred to add the free-radical initiator to the reactor gradually during the course of the polymerization; it is also desirable to match the addition rate of the free-radical initiator to the addition rate of the acrylate or methacrylate monomer.

Suitable liquid acrylic polyols include copolymers of n-butyl acrylate and allyl monopropoxylate, n-butyl acrylate and allyl alcohol, 2-ethylhexyl acrylate and allyl alcohol monopropoxylate, and the like, and mixtures thereof.

The resinous polyol of the polyol blend preferably has an Mn within the range of about 500 to about 10,000, hydroxyl number about 20 mg KOH/g to about 500 mg KOH/g, and $T_g$ greater than about 25° C. The resinous polyol preferably comprises recurring units of a hydroxy-functional monomer as described above. Unlike for the liquid acrylic polyol, the hydroxyl-functional monomers for the resinous polyol preferably have high homopolymer $T_g$ and primary OH groups. Preferred hydroxy-functional monomers for the resinous polyols include allyl alcohol, ethoxylated allyl alcohol, methallyl alcohol, the like, and mixtures thereof. The hydroxyl-functional monomer is used in an amount sufficient to give the resinous polyol the desired hydroxyl number. It is usually used in an amount within the range of about 2% to about 60% by weight of the resinous polyol composition.

The resinous polyol preferably comprises also recurring units of a comonomer whose homopolymer has $T_g$ greater than about 25° C. The comonomer is preferably selected from vinyl aromatics, $C_1$ to $C_{20}$ alkyl, aryl, and cycloalkyl acrylates or methacrylates. Examples of suitable comonomers include styrene, α-methyl styrene, p-methyl styrene, t-butyl styrene, methyl methacrylate, t-butyl methacrylate, iso-butyl methacrylate, benzyl methacrylate, cyclohexyl methacrylate, tetrahydrofuryl methacrylate, and iso-bornyl methacrylate, and the like, and mixtures thereof. The aromatic, acrylate, or methacrylate comonomer is commonly the major component in the resinous polyol. The amount used depends on many factors, particularly the desired $T_g$ and hydroxyl number of the polyol. Preferably, the resinous polyol comprises an amount within the range of about 50% to about 90% by weight of recurring units derived from the aromatic, acrylate, or methacrylate comonomer; a more preferred range is from about 60% to about 80% by weight.

Suitable resinous polyols include, for example, copolymers of styrene and allyl alcohol, styrene and allyl propoxylate, methyl methacrylate and allyl alcohol, methyl methacrylate and allyl propoxylate, t-butyl methacrylate and allyl alcohol, t-butyl methacrylate and allyl propoxylate, isobornyl methacrylate and allyl propoxylate, and the like, and mixtures thereof. Preferred resinous polyols include commercially available copolymers of styrene and allyl alcohol, such as SAA-100, SAA-101, and SAA-103, and ACRYFLOW® A140 and A90. These resinous polyols are products of Lyondell Chemical Company.

Methods for preparing the resinous polyols are similar to those for the liquid acrylic polyols described above. U.S. Pat. Nos. 5,382,642 and 5,444,141 teach how to prepare styrene-allyl propoxylate copolymers and styrene-allyl alcohol copolymers; their teachings are incorporated herein by reference.

Preferably, the composition of the invention further comprises a reactive diluent. Reactive diluents are used to adjust the viscosity of the coating composition. Suitable reactive diluents include acrylates, methacrylates, and vinyl ether. Examples are hexylacrylate, 2-ethylhexylacrylate, isobornylacrylate, decylacrylate, laurylacrylate, stearylacrylate, ethoxyethoxy-ethylacrylate, laurylvinylether, 2-ethylhexylvinyl ether, N-vinyl formamide, isodecyl acrylate, isooctyl acrylate, vinylcaprolactam, N-vinylpyrrolidone, and the like, and mixtures thereof.

Suitable reactive diluents also include multifunctional monomers. Examples are 1,6-hexanedioldiacrylate, trimethylolpropanetriacrylate, hexanedioldivinylether, triethyleneglycoldiacrylate, pentaeritritoltriacrylate, tripropyleneglycol diacrylate, alkoxylated bisphenol A diacrylate, the like, and mixtures thereof.

The composition optionally comprises a photoinitiator. Many photoinitiators can be used. They include benzophenones and acetophenone. Examples are alpha-hydroxyalkylphenylketones, benzoin alkyl ethers and benzil ketals, monoacylphosphine oxides, and bisacylphosphine oxides. The amount of photoinitiator is not particularly limited but typical amounts can be, for example, about 0.3 wt % to about 10 wt %, and preferably, about 1 wt % to about 5 wt % of the final coating solids.

The composition optionally includes a crosslinking catalyst. The type of crosslinking catalyst depends on the type of coating made. When the crosslinking agent is an isocyanate, suitable catalysts are those commonly known in the polyurethane art for catalyzing the reaction of hydroxyl groups and isocyanate groups. Preferred polyurethane catalysts are amine, organozinc, and organotin compounds. Examples are stannous octoate and dibutyltin dilaurate. When the crosslinking agent is a melamine, an organic sulfonic acid such as p-toluenesulfonic acid is a preferred crosslinking catalyst. Organotin compounds are commonly used with silane crosslinkers. The amount of catalyst used in the coating depends on many factors, but is typically present in an amount within the range of about 0.0001 to about 5% by weight.

The composition optionally comprises an organic solvent. Suitable solvents include, for example, ethers, esters, ketones, aromatic and aliphatic hydrocarbons, alcohols, glycol ethers, glycol ether esters, and the like, and mixtures thereof. Ketones, ethers, esters, aromatic hydrocarbons, and mixtures thereof, are preferred. Preferably, the solvents are selected from those which have low photochemical reactivity and fast evaporation rate. More preferably, the solvents are selected from those which are exempted, or potentially exempted, from VOC regulations by the U.S. EPA, such as acetone, methyl acetate, and t-butyl acetate.

Solvents are used in an amount preferably less than 30 wt % of the total coating composition. More preferably, the amount of solvents is less than 20 wt % of the total coating composition. An advantage of the invention is the use of acrylic polyols which comprise recurring units of allylic alcohol. These polyols have high and uniform hydroxyl functionality even at very molecular weights. They have lower solution viscosity than acrylic polyols made from hydroxyalkyl acrylates or methacrylates. More advantageously, the invention preferably uses a blend of a liquid acrylic polyol and a resinous acrylic polyol. Such a combination provides the coatings with excellent physical properties such as hardness and gloss, dry time, and low solvent demand.

Other additives such as pigments, adhesion promoters, antioxidants, and UV stabilizers can also be included in the composition of the invention. Examples of suitable stabilizers are hindered phenol-based anti-oxidant reagents such as 2,6-di-t-butyl-4-methylphenol and benzotriazole and hindered amine-based stabilizers such as various types of Tinuvins (Ciba Geigy, Switzerland), and phosphorus-based stabilizers such as Sumilyzer RTM. Examples of suitable pigments include titanium oxide, zinc oxide and carbon black. Examples of suitable adhesion promoters include phosphated acrylate esters such as SR9008 (product of Sartomer, Exton, Pa.).

The composition can be packaged in two separate parts. This is so called AB two-part or "2K" system. Part A may comprise a mixture of the hydroxyalkyl acrylate or hydroxylmethacrylate and the crosslinking agent. Part B may comprise the hydroxyl acrylic resin and the reactive diluents. The optional catalysts, photoinitiators, pigments, solvents, and additives can be packaged with either A or B, or both. Parts A and B are then mixed prior to use.

The compositions are applied by rollers, brush, spray, or any other suitable means. They are dual-cure systems. The composition can be irradiated to be solidified and then fully cured by the urethane, melamine, or silane reactions. Alternatively, the composition can be first cured by urethane, melamine, or silane reactions, and then fully cured by radiation.

The invention provides a UV-curable system with low VOC and high performance. More importantly, the invention provides a dual-cure system without the use of acrylated oligomers.

The following examples merely illustrate the invention. Those skilled in the art will recognize many variations that are within the spirit of the invention and scope of the claims.

EXAMPLE 1

Preparation of UV-Curable, 2K Urethane Coating
Preparation of Part A
14.5 parts of HDI trimer (80% in acetone, product of Bayer), 0.81 part of Irgacure 819 (photoinitiator, product of Ciba Geigy), 0.73 part of of dibutyl tin dilaurate (1% in methyl ethyl ketone, urethane catalyst, product of Ciba Geigy), 1.1 parts of Tinuyin 400 (hindered amine light stabilizers (HALS), product of Ciba Geigy), 1.1 parts of Tinuyin 292 (UV stabilizer, product of Ciba Geigy), and 0.5 part of BYK 358 (flow modifier, product of Ciba Geigy) are mixed.
Preparation of Part B
16.1 parts of ACRYFLOW® A140 (a resinous acrylic polyol having OH#: 140 mg KOH/g, Mn: 2500, Mw: 6000, $T_g$: 50° C., product of Lyondell Chemical Company), 3.75 parts of ACRYFLOW P120 (a liquid hydroxyl acrylic having OH#: 120 mg KOH/g, Mn: 2600, Mw 5700, Tg: −40° C., product of Lyondell Chemical Company), 2.5 parts of IBOA (isobornyl acrylate), 2.5 parts of hydroxyethyl acrylate (HEA) 2.5 parts of PO6-TMPTA (propoxylated trimethylolpropane triacrylate) and 2.5 parts of SR9008 (adhesion promoter, product of Sartomer) are mixed.
Preparation of Coating
Parts A and B are mixed. The formulation has a solid % of 80% and viscosity less than 200 cps at 25° C. It is spread onto Bonderite steel panels with drawdown bar to give a dry coating of about 1–3 mils. All films are cured with 12 passes under a Fusion D-Bulb at 2.5 irradiation seconds per pass. Total irradiation time is about 30 seconds and total UV energy is 20.5 J/cm$^2$. The films are further cured at room temperature for 7 days, and then tested for physical properties which are listed in Table 1.

EXAMPLE 2

Preparation of UV-Curable, 2K Urethane Coating
Preparation of Part A
Part A is the same as that in Example 1.
Preparation of Part B
10.7 parts of ACRYFLOW A140, 7.5 parts of ACRYFLOW P120, 2.5 parts each of IBOA, HEA, PO$_6$-TMPTA, and SR9008 are mixed.
Preparation of Coating
Parts A and B are mixed. The formulation has a solid % of 83% and viscosity less than 200 cps at 25° C. The coating is applied and cured in the same way as in Example 1, and the physical properties are also listed in Table 1.

COMPARATIVE EXAMPLE 3

A coating which is similar to that in Example 1 is prepared, but no 19.85 parts of ACRYFLOW P120 and no resinous ACRYFLOW A140 are used. The coating remains tacky after radiation.

TABLE 1

COATINGS COMPOSITIONS AND PROPERTIES

|  | Example 1 | Example 2 |
|---|---|---|
| Part A |  |  |
| HDI Trimer (80% in acetone) | 14.5 | 14.4 |
| Irgacure 819 in 1174 | 0.81 | 0.81 |
| DBTDL | 0.73 | 0.73 |
| 50% Tinuvin 400 | 1.1 | 1.1 |
| 50% Tinuvin 292 | 1.1 | 1.1 |
| BYK 358 | 0.5 | 0.5 |
| Part B |  |  |
| ACRYFLOW A140 (70% in acetone) | 16.1 | 10.7 |
| ACRYFLOW P120 | 3.75 | 7.5 |
| IBOA | 2.5 | 2.5 |
| PO$_6$-TMPTA | 2.5 | 2.5 |
| HEA | 2.5 | 2.5 |
| SR9008 | 2.5 | 2.5 |
| Formulation Constants |  |  |
| % solids | 80 | 83 |
| Viscosity, cps | <200 | <200 |
| VOC content lbs/gal | 0.0 | 0.0 |
| Tack & print-free after UV cure | yes | yes |
| Film Properties after 7 days |  |  |
| Film thickness (mil) | 1.8 | 1.8 |
| König Hardness | 158 | 125 |
| Direct Impact, inch-lb | 150 | 160 |
| Reverse Impact, inch-lb | 140 | 160 |
| Cross-hatch Adhesion | 5 B | 5 B |
| MEK Rubs, times | 200 | 200 |

ASTM methods: König Hardness: D523, Cross-hatch adhesion: D3002, Impact: D3281.

We claim:

1. A UV-curable composition comprising (a) a crosslinking agent selected from the group consisting of multifunctional isocyanates, melamines, and silanes;

(b) a hydroxyalkyl acrylate or hydroxyalkyl methacrylate; and (c) an acrylic polyol comprising recurring units of an allylic alcohol.

2. The composition of claim 1 wherein the crosslinking agent is a multifunctional isocyanate.

3. The composition of claim 2 wherein the multifunctional isocyanate is selected from the group consisting of toluene diisocyanate (TDI), polymeric TDI, diphenylmethane diisocyanate (MDI), polymeric MDI, 1,6-hexamethylene diisocyanate (HDI), polymeric HDI, isophorone diisocyanate (IPDI), polymeric IPDI, dicyclohexylmethane diisocyanate (H$_{12}$MDI), and polymeric H$_{12}$MDI, and mixtures thereof.

4. The composition of claim 2 wherein the crosslinking agent is a multifunctional isocyanate selected from the group consisting of HDI, polymeric HDI, IPDI, polymeric IPDI, H$_{12}$MDI, and polymeric H$_{12}$MDI.

5. The composition of claim 1 wherein the crosslinking agent is a melamine.

6. The composition of claim 1 wherein the crosslinking agent is a silane.

7. The composition of claim 1 wherein the hydroxyalkyl acrylate or hydroxyalkyl methacrylate is selected from the group consisting of hydroxyethyl acrylate, hydroxypropyl acrylate, hydroxyethyl methacrylate, hydroxypropyl methacrylate, hydroxybutyl acrylate, hydroxybutyl methacrylate, caprolactone acrylate, caprolactone methacrylate, and mixtures thereof.

8. The composition of claim 1 wherein the acrylic polyol is a polyol blend comprising a liquid acrylic polyol and a resinous polyol in a ratio within the range of 10/90 to 90/10 by weight; wherein the liquid acrylic polyol has Mn within the range of about 500 to about 10,000, hydroxyl number within the range of about 20 mg KOH/g to about 500 mg KOH/g, and a glass transition temperature (T$_g$) within the range of about −70° C. to about 0° C.; and the resinous polyol has Mn within the range of about 500 to about 10,000, hydroxyl number within the range of about 20 mg KOH/g to about 500 mg KOH/g, and T$_g$ greater than about 25° C.

9. The composition of claim 8 wherein the liquid acrylic polyol comprises:

(a) from about 2% to about 60% by weight of recurring units of a hydroxy-functional monomer selected from the group consisting of allyl and methallyl alcohols, alkoxylated allyl and methallyl alcohols;

(b) from about 40% to about 98% by weight of recurring units of a C$_1$ to C$_{20}$ alkyl acrylate or methacrylate whose homopolymer has a T$_g$ below about 25° C.; and (c) optionally, up to about 25% by weight of recurring units of a third monomer that is selected from the group consisting of vinyl aromatics, vinyl halides, vinyl ethers, vinyl esters, acrylic and methacrylic acids, unsaturated nitriles, conjugated dienes, and mixtures thereof.

10. The composition of claim 8 wherein the resinous polyol comprises:

(a) from about 2% to about 60% by weight of recurring units of a hydroxyl functional monomer selected from the group consisting of allyl and methallyl alcohols, alkoxylated allyl and methallyl alcohols;

(b) from about 40% to about 98% by weight of recurring units of a monomer selected from the group consisting of vinyl aromatics, and C$_1$ to C$_{20}$ alkyl, aryl, and cyclic acrylates and methacrylates whose homopolymers have a T$_g$ greater than or equal to 25° C.; and (c) optionally, up to about 25% by weight of recurring units of a third monomer selected from the group consisting of vinyl halides, vinyl ethers, vinyl esters, acrylic and methacrylic acids, conjugated dienes, and mixtures thereof.

11. The composition of claim 8 wherein the liquid acrylic polyol is a copolymer of n-butyl acrylate and an allylic alcohol selected from the group consisting of allyl and methallyl alcohols, ethoxylated allyl and methallyl alcohols of 1 to 5 oxyethylene units, propoxylated allyl and methallyl alcohols of 1 to 5 oxypropylene units, and mixtures thereof.

12. The composition of claim 8 wherein the liquid acrylic polyol is a copolymer of n-butyl acrylate and allyl propoxylate of 1 to 5 oxypropylene units.

13. The composition of claim 8 wherein the resinous polyol is a copolymer of styrene and an allylic alcohol selected from the group consisting of allyl alcohol, ethoxylated allyl alcohols of 1 to 5 oxyethylene units, propoxylated allyl alcohols of 1 to 5 oxypropylene units, and mixtures thereof.

14. The composition of claim 8 wherein the resinous polyol is a copolymer of styrene and allyl alcohol.

15. The composition of 8 wherein the resinous polyol is a copolymer of styrene, isobornyl methacrylate, and allyl propoxylate.

16. The composition of claim 1 further comprising a reactive diluent selected from the group consisting of acrylates, methacrylates, and vinyl ethers.

17. The composition of claim 1 wherein the composition is packaged into AB two separate parts, wherein part A comprises the crosslinking agent and part B comprises the hydroxyalkyl acrylate or hydroxyalkyl methacrylate and the acrylic polyol.

18. The composition of claim 1 containing no VOC.

* * * * *